United States Patent
Rosinski et al.

(10) Patent No.: US 11,193,836 B2
(45) Date of Patent: Dec. 7, 2021

(54) APPARATUS HAVING A SEMICONDUCTOR STRAIN GAGE ENCASED WITHIN CERAMIC MATERIAL FOR MEASURING STRAIN AND METHODS FOR MAKING AND USING SAME

(71) Applicant: Electric Power Research Institute, Inc., Palo Alto, CA (US)

(72) Inventors: Stanley Timothy Rosinski, Charlotte, NC (US); Christopher Adam Suprock, Warren, NH (US); Joseph James Christian, Eliot, ME (US)

( * ) Notice: Subject to any disclaimer, the term of this patent is extended or adjusted under 35 U.S.C. 154(b) by 306 days.

(21) Appl. No.: 16/262,690

(22) Filed: Jan. 30, 2019

(65) Prior Publication Data

US 2019/0234815 A1  Aug. 1, 2019

Related U.S. Application Data

(60) Provisional application No. 62/624,936, filed on Feb. 1, 2018.

(51) Int. Cl.
| | |
|---|---|
| *G01L 1/18* | (2006.01) |
| *G01L 19/14* | (2006.01) |
| *G01L 19/06* | (2006.01) |

(52) U.S. Cl.
CPC ............ *G01L 1/18* (2013.01); *G01L 19/0681* (2013.01); *G01L 19/147* (2013.01)

(58) Field of Classification Search
None
See application file for complete search history.

(56) References Cited

U.S. PATENT DOCUMENTS

| | | | |
|---|---|---|---|
| 4,481,497 A | 6/1984 | Kurtz et al. | |
| 5,554,806 A | 10/1996 | Mizuno et al. | |
| 6,034,296 A | 7/2000 | Elvin et al. | |
| 8,124,953 B2 * | 2/2012 | Elian ..................... | H01L 21/563 257/3 |
| 10,345,161 B2 * | 7/2019 | Caltabiano ............ | G01L 9/0041 |
| 10,408,692 B2 * | 9/2019 | Miyajima ............. | G01L 1/2293 |
| 2008/0233370 A1 | 9/2008 | Nakao et al. | |
| 2012/0048028 A1 * | 3/2012 | Miyajima ............. | G01L 1/2293 73/777 |
| 2018/0003576 A1 | 1/2018 | Gregory et al. | |

FOREIGN PATENT DOCUMENTS

| | | |
|---|---|---|
| CA | 780627 A | 3/1968 |
| CN | 107543629 A | 1/2018 |
| EP | 1312906 A2 | 5/2003 |
| WO | WO 2018/009905 A2 | 11/2018 |

* cited by examiner

*Primary Examiner* — Andre J Allen
*Assistant Examiner* — Jermaine L Jenkins
(74) *Attorney, Agent, or Firm* — Owens Law Firm, PC

(57) ABSTRACT

The invention relates to a strain gage and methods for making and using the same to measure strain of a surface of interest. In particular, the invention relates to a semiconductor strain gage held by a metal body using a ceramic interface between the gage and the body, which that can be attached to a surface of interest. The invention also relates to methods for making the ceramic interface and attaching the semiconductor strain gage to a surface of interest. The invention, including its various embodiments, also relates to using the semiconductor strain gage to measure strain at temperatures above 1000° F.

20 Claims, 7 Drawing Sheets

APPARATUS HAVING A SEMICONDUCTOR STRAIN GAGE ENCASED WITHIN CERAMIC MATERIAL FOR MEASURING STRAIN AND METHODS FOR MAKING AND USING SAME

BACKGROUND OF THE INVENTION

Field of the Invention

The invention, including its various embodiments, relates to a strain gage and methods for making and using the same to measure strain of a surface of interest, such as a metal surface. In particular, the invention, including its various embodiments, relates to a semiconductor strain gage having a ceramic interface that can be attached to a surface of interest. The invention, including its various embodiments, also relates to methods for making the ceramic interface and attaching the semiconductor strain gage and ceramic interface to the surface of interest. The invention, including its various embodiments, also relates to using the semiconductor strain gage to measure strain at temperatures above 1000° F., including above 1000° F. for ultra-supercritical steam boilers.

Description of Related Art

Extensive load cycling of thermal power plants results in accumulation of component damage, especially in thick-walled components. The ability to accurately measure component strain on high-temperature components, including welds, is presently an unmet industry-wide need.

High-temperature strain monitoring applications have been limited to traditional capacitive or wire gages with limited mechanical bandwidth, low sensitivity, and high cost. Mounting of these traditional strain gages on the surface of a component is generally performed using welding. Unfortunately, application of these gages is still generally limited to relatively moderate temperatures and with limited bandwidth and low sensitivity. For example, traditional strain gage technologies using plastic adhesives for mounting are not capable of surviving field environments above 400° F., let alone above 1000° F. or 1200° F., which limits the application of online nondestructive testing via strain monitoring.

The lack of sensitivity provided by traditional strain gages such as foil type resistive strain gages and capacitive strain gages can result in the late detection of events. As a result of this poor performance of present stain gage technologies, critical assets in power generation facilities containing high temperature weldments or load bearing elements are unmonitored. The present inability to monitor dynamic strain on critical power plant components in a high temperature environment becomes more problematic as power generation facilities transition to cyclic modes of operation that involve severe temperature ramp rates that can cause significant thermal strain in components.

Accordingly, there is a need for a strain gage that addresses these limitations of traditional strain gages. In particular, there is a need for a strain gage that provides strain measurement at higher temperatures, for example, temperatures above 400° F., 1000° F. or 1200° F. Further, there is a need for a strain gage that provides strain measurement for components used in power generation facilities exposed to such high temperatures, such as high temperature weldments and load bearing elements.

BRIEF SUMMARY OF THE INVENTION

The present invention provides an apparatus or device for measuring strain. In one embodiment, the present invention provides a device for measuring strain, comprising a body comprising a ceramic portion and a semiconductor strain gage bonded to and encased within the ceramic surface, wherein said body has a surface for attachment to an object to measure strain. In some embodiments, the body is a metal body and the semiconductor strain gage encased within the ceramic portion is within the metal body. In some embodiments, the body is a metal body and the semiconductor strain gage encased within the ceramic portion is on a top surface of the metal body.

The present invention also provides methods for making the apparatus or device for measuring strain. In one embodiment, the present invention provides a method for making a device for measuring strain, comprising forming a ceramic portion attached to a body; and bonding a semiconductor strain gage to the ceramic portion, wherein the semiconductor strain gage is surrounded by the ceramic portion.

The present invention also provides methods for measuring strain using the apparatus or device for measuring strain. In one embodiment, the present invention provides a method for measuring strain of an object, comprising attaching a body comprising a semiconductor strain gage encapsulated in a ceramic material to a surface of an object, wherein the semiconductor strain gage comprises one or more signal wires electrically connected to the semiconductor strain gage and passing through the ceramic material; electrically connecting the one or more signal wires to an instrument configured for receiving an electrical signal produced by the semiconductor strain gage; and recording an electrical signal produced by the semiconductor strain gage with the instrument.

In another embodiment, the present invention provides a method for attaching a device for measuring strain to a metal surface, comprising welding to a surface of a metal component a semiconductor strain gage encapsulated in a ceramic material disposed within an opening in a metal body having a flat surface, wherein the semiconductor strain gage comprises one or more signal wires electrically connected to the semiconductor strain gage and passing through the ceramic material and wherein the flat surface is disposed against the surface of the metal component.

The present invention in its various embodiments provides an apparatus for strain measurement at higher temperatures, for example, temperatures above 1000° F. with the continued ability to measure strain both statically and dynamically. In particular, the present invention in its various embodiments provides an apparatus for strain measurement for components used in power generation facilities exposed to such high temperatures, such as high temperature weldments and load bearing elements, among others. The strain gage is a high bandwidth strain gage and may be a semiconductor strain gage made from mono-crystalline silicon or silicon carbide. The strain gage is immune to hysteretic effects and frequency response that influence wire gages and capacitive gages to limit mechanical bandwidth. The strain gage also has a higher gage factor than other types of gages due to piezoresistivity.

An additional advantage, particularly resulting from the use of a porous metal/ceramic layer or interface, is the ability to build a gage onto a field-deployable structure (shim, bar, load cell, membrane, or the like) that can be welded onto pipes, manifolds, support structures, etc. This can be done in a plant environment without delicate work. Accordingly, the field-deployable structure, such as a metal shim, can be considered an attachable load cell that responds along with surface strain in the parent structure.

Another advantage of the invention is the ability to deploy it using low energy capacitive discharge welding. The use of capacitive discharge welding is within the limits of welding permitted on boiler structures for existing sensor technologies such as thermocouples. The use of such procedures prevents the need for structural weld pre-heat or post-heating. In some embodiments, the strain sensor can be attached by multiple capacitive discharge studs. It can also be deployed within the bonded face of a single stud, eliminating any need for multiple attachment points. Additionally, the use of capacitive discharge stud welding allows this sensor technology to be deployed by the expected skill level of power industry workers.

DETAILED DESCRIPTION OF THE INVENTION

Figure 1:
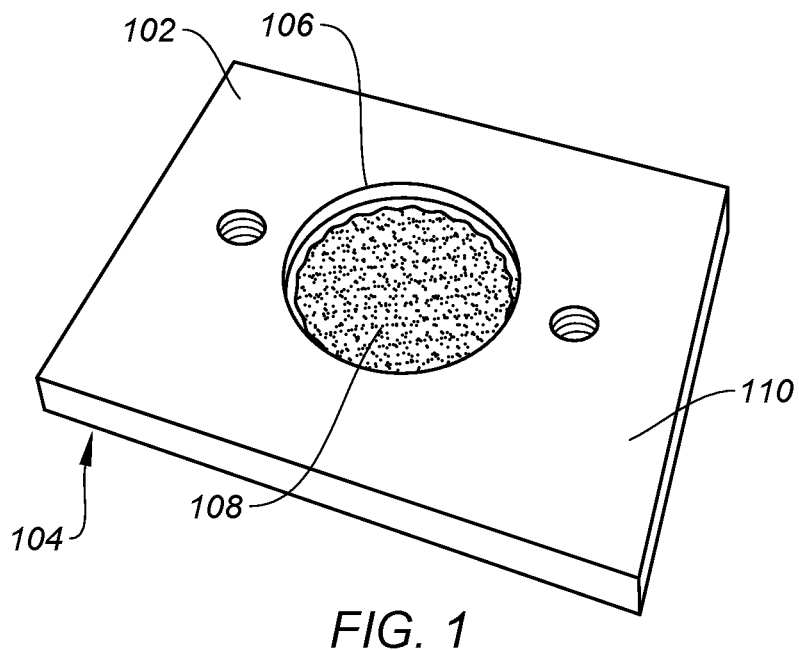
FIG. 1 is a top perspective view of a metal shim and porous sintered disk according to one embodiment of the invention.

The present invention is more fully described below with reference to the accompanying drawings. While the present invention will be described in conjunction with particular embodiments, such should be viewed as examples and should not be viewed as limiting or as setting forth the only embodiments of the invention. Rather, the present invention includes various embodiments or forms and various aspects or features, including alternatives, modifications, and equivalents within the spirit and scope of the invention and the claims. Further, the use of the terms "invention," "present invention," "embodiment," and similar terms throughout this description are used broadly and are not intended to mean that the invention requires, or is limited to, any particular embodiment or aspect being described or that such description is the only manner in which the invention may be made or used.

In general, the present invention is directed to a semiconductor strain gage for use in measuring strain in objects of interest, such as metal objects. In particular, the semiconductor strain gage is attached to a ceramic interface that is chemically, mechanically, or both chemically and mechanically, affixed to a metal body, such as a metal shim or other metal body, which serves as a load cell in use. The ceramic interface is formed from a liquid ceramic material that is infused into a porous portion of the metal body to create an electrically insulated base layer atop which one or more semiconductor strain gages can be mounted. Accordingly, the porous portion serves not only as a support for the semiconductor strain gage but also as an interface between the semiconductor strain gage and the metal shim by bonding between the ceramic and the metal shim. The porous portion of the metal body or metal shim can be provided in various ways, including the use of a porous sintered disk, 3D printing, foam metal, and similar techniques. In some embodiments, the semiconductor strain gage is surrounded by, encased, or entombed within the ceramic.

The metal body or metal shim containing the semiconductor strain gage can be attached to a surface of the object of interest to measure the strain of the surface using the semiconductor strain gage. The measured strain is electrically passed from the semiconductor strain gage through signal wires that are ultimately electrically connected to an instrument for recording the electrical signal or measured strain. The metal body or metal shim holding one or more semiconductor strain gages and the related signal wires and any related electrical connectors may be housed in a housing or protective box.

Accordingly, in some embodiments, the invention provides a portable or field-deployable semiconductor strain gage sensor that can be easily attached to a surface of interest, such as a metal surface of interest such as pipes, manifolds, support structures, etc. The semiconductor strain gage can be used at relatively higher temperatures, including temperatures at or above 400° F., 500° F., 1000° F., and 1200° F. Accordingly, the semiconductor strain gage can be used to measure strain of high temperature components, such as components having metal surfaces at temperatures that exceed those at which ordinary strain gages may be used. For example, the semiconductor strain gage of the present invention may be used to measure strain for components used in power generation facilities that are exposed to such high temperatures, including high temperature weldments, load bearing elements, control valves, dump valves, turbine casings, turbine high temperature components, control system hydraulic valves, spring components, reactor head, reactor control rod structures, reactor primary circulation pumps, boiler manifolds, boiler structural supports, bellows, expansion joints, main steam piping, high energy piping, and superheat and reheat outlet headers. Following, various embodiments and aspects of invention are described in connection with the figures. In particular, various embodiments of the strain gage, methods for making the strain gage, and methods for using the stain gage are described.

FIG. 1 is a top perspective view of a metal shim and porous sintered disk according to one embodiment of the invention. As shown, a metal body 102, which in this embodiment is a metal shim, will hold a semiconductor strain gage and will ultimately serve as a load cell for the semiconductor strain gage during use in that it will be attached to a surface of interest, such as a metal surface of a metal component of interest, for which strain will be measured. The metal shim 102 may be any size and may have any shape, including a rectangular or square shape. However, since the metal shim 102 will ultimately serve as the load cell and be attached to the surface of interest for which the stain is being measured, the size and the shape of the metal shim 102 should be selected to facilitate its attachment to the surface of interest. As noted, in use, the metal shim 102 will be attached to the surface of interest via an underside or bottom side 104 of the metal shim 102. Accordingly, the underside or bottom side 104 of the metal shim 102 should be capable of being affixed to the surface of interest either mechanically or by a welding process. In some embodiments, the underside or bottom side 104 of the metal shim 102 may be a relatively flat or smooth surface so as to allow for sufficient contact between the metal shim 102 and the surface of interest and for ease of assembly. The metal shim 102 may be made of any metal, such as any stainless steel, such as 316 stainless steel, or alloy. The metal shim 102 may be composed of metal matrix composites, binary or plural metal systems, or 3D printed materials such as sintered or infused powdered metals. In some embodiments, the metal shim 102 may be made of a metal having the same or similar composition to that of a metal surface for which the strain will be measured. In this case, thermal strain during use may be avoided or minimized. However, in cases in which the composition of the metal shim 102 does not match that of the metal surface of interest, an offset can be used to calculate the correct strain measurement. In some embodiments in which the semiconductor strain gage will be used at relatively high temperatures, the metal composition of the metal shim 102 should be selected to withstand such temperatures. In some embodiments, the composition of the metal shim 102 may be selected from a mixture of metal alloys that are sintered or mixed in a specific ratio that is favorable to thermal expansion such that it matches the thermal expansion of the ceramic bonding and insulating layers (described further below). It should be appreciated that this metal shim may be manufactured using various methods known in the art. In addition, 3D printing may be employed to create this shim structure with the desirable properties and geometry.

The metal shim 102 is configured with an opening 106 to house a porous sintered disk 108. This opening 106 can be machined into the metal shim 102. The opening 106 may take any shape, including a circular shape in which case the opening will have a cylindrical shape. The opening 106 passes completely through the metal shim 102 from a top side 110 through to the bottom side 104 of the metal shim 102 such that it can be accessed from either the top side 110 or the bottom side 104 of the metal shim 102. The opening 106 is dimensioned to allow the porous sintered disk 108 to be attached within the opening 106 of the metal shim 102. Accordingly, in some embodiments, the opening 106 is the same shape as the porous sintered disk 108, including a circular shape. It should be appreciated that the opening 106 does not need to pass completely through the shim 102 in which case the opening 106 may simply be a pocket or depression in the metal shim 102.

Figure 2:
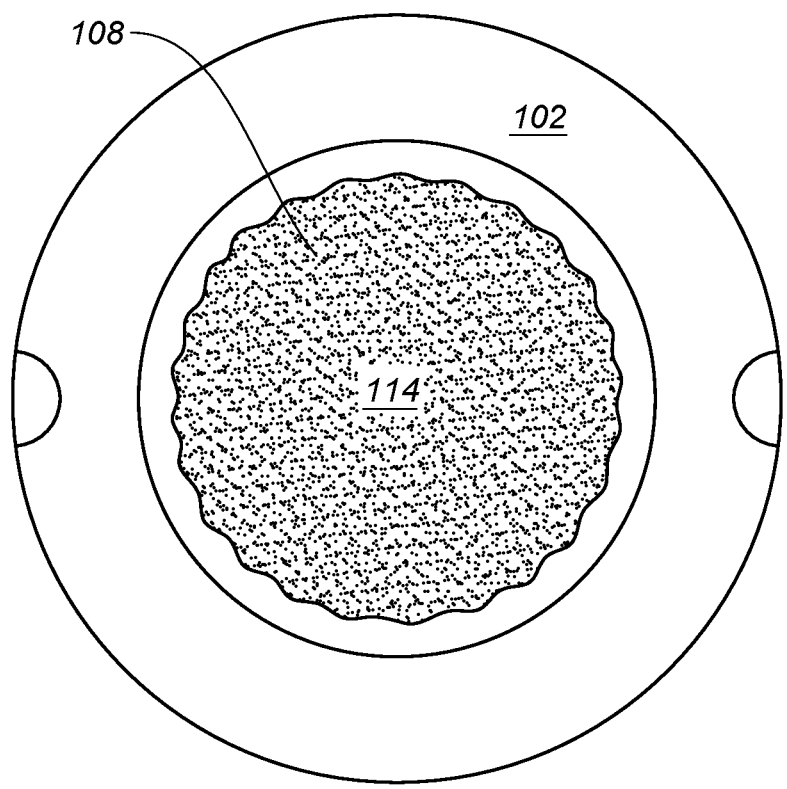
FIG. 2 is a top view of a porous sintered disk disposed within a metal shim according to one embodiment of the invention.

FIG. 2 is a top view of a porous sintered disk disposed within a metal shim according to one embodiment of the invention. The porous sintered disk 108 provides the structure for forming the ceramic interface or ceramic layer on which the semiconductor strain gage will be attached and which is bonded to the metal shim 102. The porous sintered disk 108 is a metal disk that has been sintered using powdered metal and that is porous to allow passage of a liquid ceramic material from one side of the porous sintered disk 108 to the other side to form and support a ceramic layer on which the semiconductor strain gage will be attached. Because the porous sintered disk 108 will, in some embodiments, also be exposed to relatively high temperatures during use of the semiconductor strain gage, the metal composition of the porous sintered disk 108 should be selected to withstand such temperatures. The sintered disk may be composed of powdered metal or foamed metal that has been formed either by isostatic pressing, gasification (foaming), or other techniques. The composition of the disk depends on the physical properties desired for a given application, such as thermal expansion and oxidation resistance. In some embodiments, the required properties dictate that high nickel, chromium, or other self-passivating or noble metal compositions are preferred. In some embodiments, the porous sintered disk 108 may have the same composition as the metal shim 102, such as any stainless steel, such as 316 stainless steel, or alloy.

The porous sintered disk 108 is disposed within the opening 106 in the metal shim 108 and attached to the metal shim 102. In some embodiments, the porous sintered disk 108 is disposed within the opening 106 in the metal shim 108 and attached by welding the porous sintered disk 108 to the metal shim 102, such as through the use of laser welding. It should be appreciated that the porous sintered disk 108 is placed within the opening 106 in the metal shim 102 such that it is below the surface surrounding the opening 106 on the top side 110 of the metal shim 102. In other words, a space is created having the porous sintered disk 108 as a bottom and the walls of the opening 106 extending from the porous sintered disk 108 to the surface on the top side 110 of the metal shim 102.

Once the porous sintered disk 108 has been attached to the metal shim 102, a liquid or flowable ceramic material is used to form a ceramic layer on the top side 114 of the porous sintered disk 108, which is on the same side as the top side 110 of the metal shim 102, within the space created by the porous sintered disk 108 and the walls of the opening 106 described above. As noted, the ceramic layer 114 is used to attach to the semiconductor strain gage and forms a ceramic insulating layer. It should be appreciated that in some embodiments, the porous sintered disk 108 may be oxidized prior to application of the ceramic material. In some embodiments, such oxidation may improve the ionic bond between the ceramic and the surface oxide of the porous sintered disk metal and may serve to clean and carbonize any contaminants, such as oils, that may be present on the surface of the porous sintered disk 108 and impair bonding with the ceramic.

The ceramic layer is created by disposing a source of liquid ceramic material against the bottom side of the porous sintered disk 108, which is on the opposite side from the top side 114 of the porous sintered disk 108. The liquid ceramic material is then pulled through the porous sintered disk 108 using a vacuum applied to the opposite side of the porous sintered disk 108, i.e., the top side 114 of the porous sintered disk 108. The porosity of the porous sintered disk 108 allows the liquid ceramic material to pass through the porous sintered disk 108 from the bottom side of the porous sintered disk 108 to the top side 114 of the porous sintered disk 108. As a result, the liquid ceramic material forms a layer on the porous sintered disk 108 on the top side 114 of the porous sintered disk 108 and takes the shape of the space by the porous sintered disk 108 and the walls of the opening 106 as described above. Accordingly, it should be appreciated that the shape of the layer of the liquid ceramic material is predetermined based upon the shape of the opening 106 created in the metal shim 102. In some embodiments, because the semiconductor strain gage is a circular semiconductor wafer, a circular or cylindrical opening 106 may be used. The thickness of the layer of the liquid ceramic material (i.e., the height of the cylindrical ceramic layer in the embodiment in which the opening 106 is a cylinder), however, can be controlled by the amount of liquid ceramic material pulled through the porous sintered disk 108. It should be appreciated that the thickness of the liquid ceramic material can be any desired thickness, noting that diamond planning, which may be used to produce an even thickness as described further below, becomes more difficult as the thickness is reduced. In some embodiments, the layer of the liquid ceramic material has a thickness of 0.010-0.005 inches. It should be appreciated that other methods known in the art may be used to deposit the liquid ceramic material on the porous sintered disk 108, such as the use of ultrasonic vibration to make the liquid ceramic material flowable or to flow through the medium. It should also be appreciated that centripetal acceleration in a centrifuge to use the fluid's weight to cause permeation of the porous material may also be used.

The ceramic material used may be any suitable ceramic material that is flowable such that it can be pulled through the porous sintered disk 108. In some embodiments, the ceramic material may be a non-Newtonian fluid and viscoelastically responsive to shock and vibration allowing the use of ultrasonic or impulse vibration to enter the porous metal. In some embodiments, the liquid ceramic material is an aggregate of one or more binders and one or more fillers that is ultimately cured, as described further below, to form a solid ceramic layer or ceramic interface. The aggregate is selected such that it will ionically bond to the metal oxides on the surface of the porous sintered disk 108, such as chromium, nickel, and ferrous oxides, etc. The filler is selected to be chemically compatible with the binder and ionically bonds to the binder during the curing process. The selection of the filler composition is used to adjust the mechanical modulus of elasticity of the aggregate and, in some embodiments, to provide a match to the elastic modulus of the composition of the porous sintered disk 108, as well as to the coefficient of thermal expansion. This reduces delta temperature strains between the ceramic material and the porous sintered disk 108 during use, for example, to avoid or minimize cracking or splitting of the semiconductor strain gage. The concentration of the filler is selected to provide the desired degree of flowability to the liquid ceramic material to allow it to pass through the porous sintered disk 108. Additionally, the filler is selected to provide the appropriate level of surface tension, which aids in securing the semiconductor strain gage to the surface of the ceramic layer. It should be appreciated that the relative concentrations of the binder and filler depend, in some cases, on the filler. In addition, the particle size of the overall aggregate effects the binder and filler concentrations. For example, nanoparticle size fillers can take up more concentration by mass because the ceramic material remains flowable, whereas larger aggregate sizes exhibit granular kinematic flow.

In some embodiments, the binder is a silicate and the filler is a metal oxide. In some embodiments, the binder may be a sodium-based silicate or a potassium-based silicate. In some embodiments, the filler may be zinc oxide (ZnO), magnesium oxide ($MgO_2$), or aluminum oxide ($Al_2O_3$), noting that a higher cure temperature may be required for the latter. In some embodiments, the filler may be a titanium oxide. In some embodiments, 20-50% or 20-30% zinc oxide by weight is used. Other materials that may be used include stainless steel powder, copper powder, nickel and nickel alloy powders, silver powders, calcium carbonate, other metal carbonates, beryllium dioxide (beryllia), diamond powder, and other metal oxides. It should be appreciated that silver powders may form an electrically conductive silver silicate with free ions to conduct electricity, which may allow for interconnects without welding, including interconnects between dissimilar metals.

It should be appreciated that the use of porous metal technology, through the use of the porous sintered disk 108, is important to applying a strain gage atop the ceramic layer, as described further below, and in maintaining attachment of the ceramic layer to the porous sintered disk 108 during use, such as during high strain and temperature cycles. In other words, the sintered porous disk 108 provides not only mechanical support for the ceramic layer but, as described above, also chemically bonds to the ceramic layer. An interlocking mechanical and chemical bond between the metal of the porous sintered disk 108 and the ceramic layer provides the ceramic layer with immunity to thermal expansion failure and is not reliant upon shear bond in an oxide layer or the bonding to the oxides on the surface of the porous sintered disk 108 alone. Also, it should be appreciated that, in use, the weld used to attach the porous sintered disk 108 to the metal shim 102 transfers the strain received form the metal surface of interest by the metal shim 102 to the porous sintered disk 108, as well as to the ceramic layer, which is then measured by the semiconductor strain gage attached to the ceramic layer, as described further below.

Figure 3:
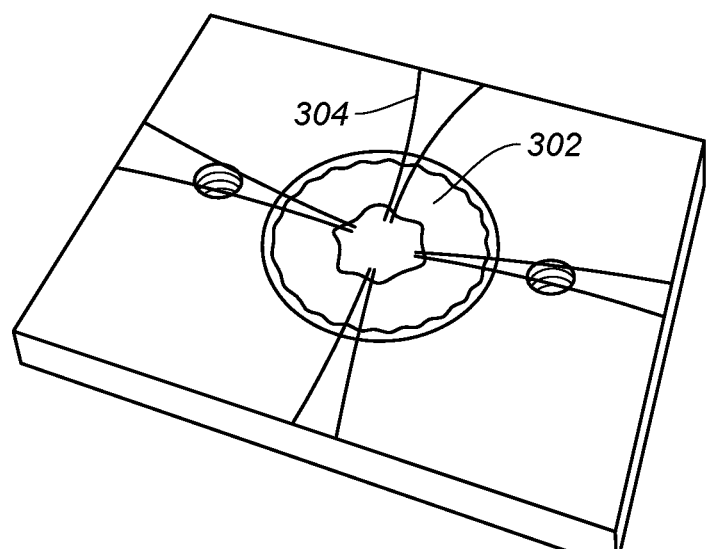
FIG. 3 is a top perspective view of a metal shim with a ceramic interface disposed on one side of a porous sintered disk with semiconductor strain gages bonded to the top of the ceramic interface according to one embodiment of the invention.

FIG. 3 is a top perspective view of a metal shim with a ceramic interface disposed on one side of a porous sintered disk with semiconductor strain gages bonded to the top of the ceramic interface according to one embodiment of the invention. Once the desired amount of liquid ceramic material has been pulled through the porous sintered disk 108, the liquid ceramic material forms a layer of liquid ceramic material 302, which ultimately forms the ceramic insulating layer. The layer of liquid ceramic material 302 is then partially cured. It should be appreciated that the layer of liquid ceramic material 302 is partially cured to effect the rejection of water from the layer of liquid ceramic material 302, which in turn will facilitate bonding of the semiconductor strain gage to the partially cured layer of liquid ceramic material 302. In some embodiments, the cure process is conducted in steps. In a first step, excess liquid water is rejected from the liquid ceramic material 302 by heating at a temperature of approximately 200-220° F. In a second step water is rejected from the liquid ceramic material more slowly by heating at a temperature of approximately 350-400° F. By rejecting water more slowly intombescence of water vapor within the cured material can be reduced or prevented. In some embodiments, this two-step curing process can be used with potassium silicate as the binder. In some embodiments, the layer of liquid ceramic material 302 is partially cured at a temperature of approximately 350-400° F. At this temperature, water will be evaporated from the binder or silicate in the aggregate. It should be appreciated that the temperature used to partially cure the liquid ceramic material can be selected based upon the activation energy level of the water associated with the binder in the aggregate. It should also be appreciated that other curing methods may be used. For example, desiccants or acids may be used to reject excess water from the liquid ceramic material. For example, boric acid may be used to initiate curing in both potassium and sodium silicates. Other organic acids, such as acetic acid, may be used as well. Methanol is a desiccant that can be used to evacuate water from the silicate compounds. In some embodiments, desiccants or acids are used to initiate the curing process but curing is ultimately completed by heating the liquid ceramic material. It should be appreciated that these chemical means of curing are useful to remove water bound to the silicate and reduce the chance of intombescence of the water during heating.

After partially curing the layer of liquid ceramic material 302, the exposed surface of the layer of liquid ceramic material 302 is planed to provide a flat or smooth surface for placement of the semiconductor strain gage. In some embodiments, the layer of liquid ceramic material 302 is diamond planed.

At this point, the semiconductor strain gage is separately immersed in a source of liquid ceramic material to coat the semiconductor strain gage, which is then placed on the surface of the partially cured liquid ceramic material 302. It should be appreciated that the liquid ceramic material in which the semiconductor strain gage is dipped may be the same or different from the liquid ceramic material used to form the layer of liquid ceramic material 302 on the porous sintered disk 108. However, it is important that the liquid ceramic material in which the semiconductor strain gage is dipped be capable of chemically bonding to the layer of liquid ceramic material 302 on the porous sintered disk 108, as this ceramic material acts to bond the semiconductor strain gage to the initial ceramic insulating layer. Accordingly, in one embodiment, the liquid ceramic material in which the semiconductor strain gage is the same as the liquid ceramic material used to form the layer of liquid ceramic material 302 on the porous sintered disk 108. It should be appreciated that because the semiconductor strain gage has been immersed and covered in liquid ceramic material, the semiconductor strain gage itself is not visible in FIG. 3.

It should be appreciated that the liquid ceramic material on the semiconductor strain gage or wafer from the dipping of the semiconductor strain gage or wafer, will essentially be added to or in contact with the partially cured liquid ceramic material on the porous sintered disk 108. However, this additional amount of liquid ceramic material associated with the semiconductor strain gage is relatively small compared to the amount of liquid ceramic material in the layer of liquid ceramic material 302 on the porous sintered disk 108. Accordingly, once the semiconductor strain gage or wafer is placed on the surface of the layer of liquid ceramic material 302 on the porous sintered disk 108, the surface tension will act to pull and hold the semiconductor strain gage or wafer to the layer of liquid ceramic material 302 on the porous sintered disk 108.

Also, as noted above, the addition of the liquid ceramic material associated with the semiconductor strain gage will not re-liquefy the partially cured liquid ceramic material on the porous sintered disk 108 due to the rejection of water during the partial curing of the liquid ceramic material on the porous sintered disk 108. In other words, by partially curing the liquid ceramic material on the porous sintered disk 108 and rejecting water prior to placement of the semiconductor strain gage and associated liquid ceramic material, the contact between the liquid ceramic material on the porous sintered disk 108 and that associated with semiconductor strain gage during placement of the semiconductor strain gage will avoid or minimize any re-liquefication of the liquid ceramic material on the porous sintered disk 108. Without a reduction in water in the liquid ceramic material on the porous sintered disk 108, the water associated with the liquid ceramic material on the semiconductor strain gage may act to re-liquefy the liquid ceramic material on the porous sintered disk 108 upon placement of the semiconductor strain gage on that liquid ceramic layer on the porous sintered disk 108. Accordingly, partially curing the liquid ceramic material on the porous sintered disk 108 will allow bonding of the liquid ceramic material in which the semiconductor strain gage has been dipped to the layer of partially cured liquid ceramic material on the porous sintered disk 108. It should be appreciated that this partial curing process can be aided through the use of chemical desiccants to remove free water from the uncured liquid ceramic material on the porous sintered disk 108 prior to reaching activation energy temperature for the rejection of water.

The use of porous sintered disks is helpful for attaching ceramics in the event that the parent shim material must remain the same as the porous disk, for example, high nickel stainless alloys. In that case, the ceramic may not bond well to a highly passivated material. The advantage of the porous element in the shim is to create a mechanical interlock with the ceramic that maintains a bond to the strain gage over various mechanical and thermal conditions. The ceramic permeates the pores of the sintered disk where it is hardened. This creates a system in which the sintered disk reinforces the ceramic and the ceramic is physically attached or locked to the metal (as opposed to solely chemically bonded to the surface). This addresses issues with the ceramic not chemically bonding to some metals sufficiently.

It should be appreciated that the semiconductor strain gage will typically be the necessary circuitry in a silicon, silicon carbide, or semiconductor wafer. Accordingly, the semiconductor wafer containing the strain gage circuitry is what is dipped in the liquid ceramic material and placed on top of the layer of partially cured liquid ceramic material 302. It should be appreciated that in some embodiments the gage active length should be greater than the aggregate particle size in the ceramic and, in some embodiments, larger than the pore size in the sintered material. Regardless, it should be appreciated that the semiconductor wafer must be sized to fit within the space created by the porous sintered disk 108 as a bottom and the walls of the opening 106 extending from the porous sintered disk 108 to the surface on the top side 110 of the metal shim 102 as described above in connection with FIG. 2.

It should also be appreciated that the semiconductor wafer may hold one or more semiconductor strain gages. For example, as shown in FIG. 3, there are four pairs of signal wires 304 that are attached to the semiconductor wafer comprising multiple strain gages, which in this case contains four semiconductor strain gages, and that pass from the respective semiconductor strain gages through the ceramic material. In this embodiment, four independent semiconductor stain gages are used to make a bridge for use in measuring strain of a metal surface of interest.

Each semiconductor strain gage is attached to signal wires 304 to electrically transmit the strain measured by the respective semiconductor strain gage. It should be appreciated that the composition of the signal wires 304 may differ depending upon the specific use of the semiconductor strain gage. For example, at higher temperatures, such as temperatures above 500° F., current semiconductor wafer and signal wire technology, such as titanium and aluminum ohmic pads or electrical contacts with gold wires used to pass electrical signals into and out of the semiconductor material, may not be sufficient due to the presence of eutectic or intermetallic phases with silicon. Accordingly, different metal compositions may be used for the pads and signal wires. In some embodiments, the metal compositions do not have a eutectic alloy with silicon below the desired operating temperature and do not form non-conductive intermetallics with silicon below the desired operating temperature. These properties also assist with the ball-bonding wires after plating. In some embodiments, nickel can be used under 1600° F.; silver can be used under 1500° F.; aluminum can be used under 1050° F.; and tungsten can be used under 1500° F. It should be appreciated that a "barrier layer" may be used in which a barrier layer of a safe metal, such as tungsten or nickel, followed by gold layer and gold leads, may be used. This keeps the gold from touching the silicon. In some embodiments, noble metals such as platinum group metals may be used, despite more difficult ball bonding and plating procedures.

In addition, the diffusion rate of the pad and lead wire material into the semiconductor, and the corresponding equilibrium point, needs to be considered based upon the desired operating temperature of the final gage assembly. In some embodiments, diffusions rates can be experimentally determined and used to select a given metal. For example, the gage structure, such as the semiconductor material, size, and thickness, as well as the metal for the ohmic contact, should be selected such that at an equilibrium state with respect to diffusion of the pad and lead wire material into the semiconductor, at or above the desired operating temperature, failure of the gage can be minimized or avoided.

Further, it should be appreciated that the diffusion of oxygen through the pad and lead wire material into the semiconductor can cause an interstitial oxide layer and subsequent failure of the ohmic attachment. In some embodiments, noble metals can be plated over the semiconductor to prevent oxygen from diffusing through the pad and destroying the ohmic contact.

It should be appreciated that the signal wires may be attached to the semiconductor strain gage or plated ohmic pad by welding, ultrasonic bonding, thermal bonding, or similar attachment methods. In some embodiments, the attachment process is conducted at a temperature greater than 300° F. In some embodiments, the attachment process is conducted at a temperature range of than 300-575° F. It should be appreciated that the specific temperature range is additive to the thermal energy input from the attachment method of choice and joins noble transition metals from the semiconductor ohmic pad and signal wire material.

It should also be appreciated that in some embodiments, enamel coated nickel, aluminum, or other conductive alloy wire for electrical interconnects to a high temperature semiconductor strain gage assembly may be used. In some embodiments, the interconnects are terminated with a plated surface, such as a noble metal plating. In some embodiments, the interconnects are terminated by welding to a stud or anchor that is partially or fully plated by a noble metal or intermetallic compound that cannot oxidize below 1200° F.

Once the semiconductor stain gage has been placed on the layer of partially cured liquid ceramic material 302, the entire ceramic material, including the layer of partially cured liquid ceramic material 302 and any liquid ceramic material added during the placement of the semiconductor strain gage on the layer of partially cured liquid ceramic material 302, is fully cured. In some embodiments, curing is performed through the application of heat. In other words, the semiconductor strain gage and the metal shim are co-fired to fully cure all ceramic material and ensure that the semiconductor gage bonds to the ceramic layer or interface.

In some embodiments, a secondary ceramic bonding process may be used in which additional or secondary liquid ceramic, different in composition and properties from the original base liquid ceramic material 302, is applied to partially re-liquefy the initial or base liquid ceramic material that has been partially cured. In this case, the secondary liquid ceramic acts to convey a bonding to the surface of the base ceramic. In some embodiments, the secondary liquid ceramic etches the base ceramic during its cure process to activate a bond with the semiconductor strain gage and the base ceramic. In some embodiments the secondary liquid ceramic material may be able to chemically etch the semiconductor oxide layer and the base ceramic via the release of high or low pH off-gassing during the cure cycle. For example, liquid ceramics in the phosphate family are able to release acidic compounds to increase the reactivity of the bonded surfaces during cure.

Figure 4:
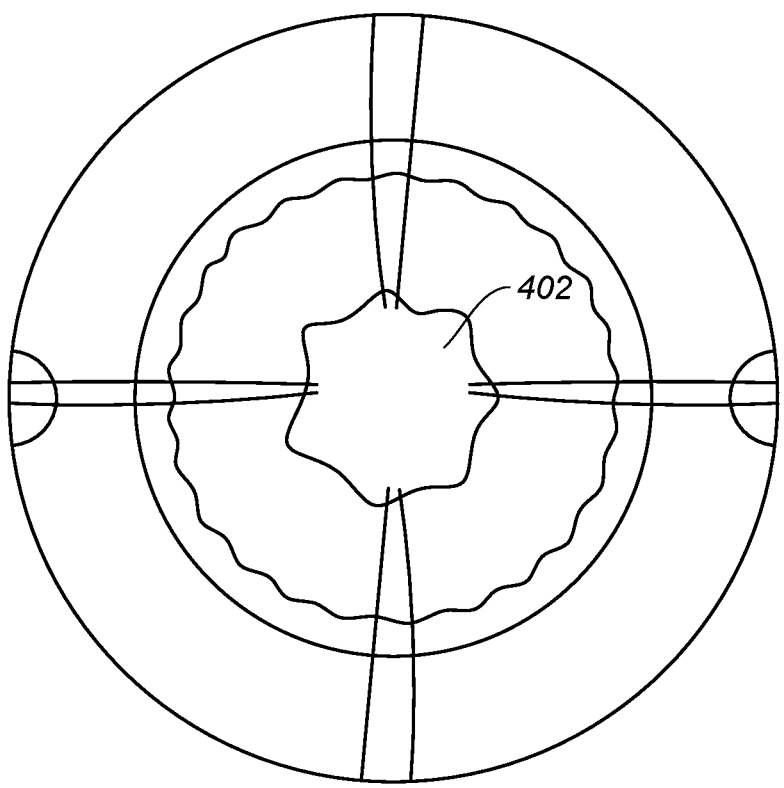
FIG. 4 is a top view of the metal shim of FIG. 3 with the bonded strain gages encapsulated in ceramic according to one embodiment of the invention.

FIG. 4 is a top view of the metal shim of FIG. 3 with the bonded strain gages encapsulated in ceramic according to one embodiment of the invention. In one embodiment, additional liquid ceramic material can be applied to mechanically cover or encapsulate the semiconductor strain gage after it has been placed on top of the layer of partially cured liquid ceramic material 302. As shown, a ceramic cover 402 can be formed to completely cover the semiconductor strain gage. This ceramic cover 402 can be formed by disposing additional liquid ceramic material on top of the semiconductor strain gage. In some embodiments, this additional ceramic material is added after the semiconductor stain gage and partially cured liquid ceramic material 302 have been fully cured. In some embodiments, this additional ceramic material is separately cured. This ceramic cover 402 acts to protect the semiconductor strain gage from direct oxygen exposure and mechanical damage during use. It also acts to tie down the lead or signal wires from the semiconductor gage to avoid vibration or strain of the semiconductor gage at the signal pad. It should be appreciated, that the liquid ceramic material used to form the ceramic cover 402 may be the same as the liquid ceramic material used to form the ceramic layer on the porous sintered disk 108 but does not need to be the same ceramic material used previously in the process.

Figure 5:
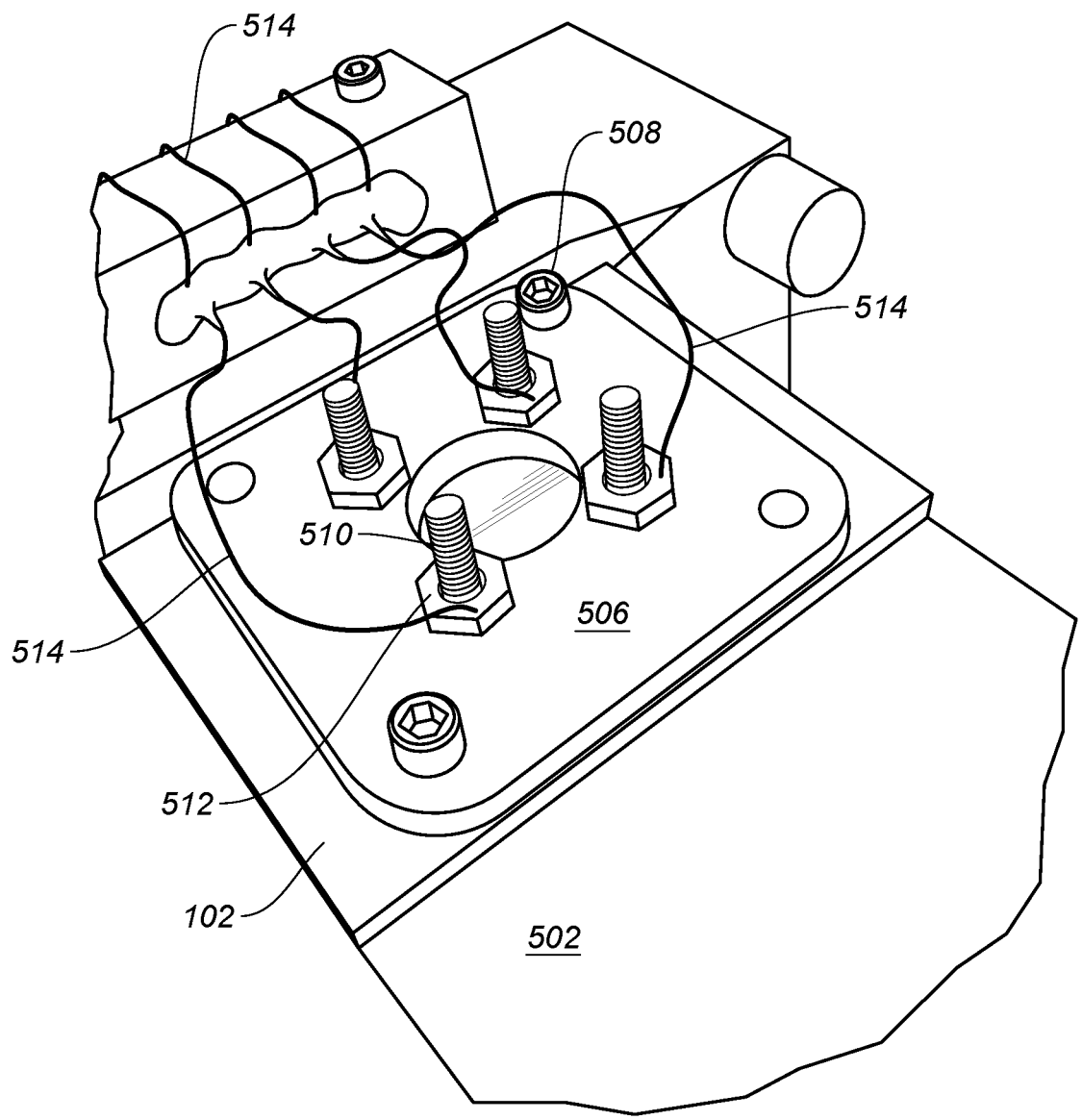
FIG. 5 is a top perspective view of the metal shim and encapsulated strain gages of FIG. 4 attached to a surface of interest.

FIG. 5 is a top perspective view of the metal shim and encapsulated strain gages of FIG. 4 attached to a surface of interest. As shown, the metal shim 102 is placed on a surface of interest 502, which may be a metal surface and may be attached through a weld. It should be appreciated that the side of the metal shim 102 that is placed against the surface of interest 502 may be cleaned prior to placement to remove any ceramic material on its surface and to ensure a relatively flat surface for attachment to the metal of interest 502. It should also be appreciated that the bottom side 116 of the porous sintered disk 108 may or may not be level with the surface of the metal shim 102 that is attached to the surface of interest 502. Regardless, any strain on the surface of interest 502 is carried through the metal shim 102 to the semiconductor strain gage attached to the porous sintered disk 108. Since the metal shim 102 is attached directly to the surface of interest 502, in some embodiments such as those in which the surface of interest 502 is a metal surface, the metal shim 102 is made from a metal that is the same or similar to that of the metal surface of interest 502, although this is not required as any offset between the composition of the metal shim 102 and the surface of interest 502 can be accounted for in processing the strain data measured by the semiconductor strain gage.

A machined plate 506 is attached to the top side 110 of the metal shim 102. In some embodiments, the machined plate 506 may be screwed to the metal shim 102 using screws 508 to anchor the machined plate 506 against the metal shim 102. The machined plate 506 provides openings for metal threaded rods 510 that are secured to the machined plate 506 using metal nuts 512. The threaded rods 510 pass through the machined plate 506 and are physically attached to, and provide an electrical connection to, the signal wires 304 that extend from the semiconductor strain gage (i.e., four pairs of signal wires 304 in the embodiment shown in FIG. 5 and similar to that of FIGS. 3 and 4). Larger signal wires 514 are attached to the metal nuts 512. Accordingly, an electrical signal from the semiconductor gage is passed through the signal wires 304 to the metal threaded rods 510 and through the metal nuts 512 to the larger signal wires 514. The larger signal wires 514 are then electrically connected to an instrument for receipt and recording of the measured strain data. It should be appreciated that the metal threaded rods 510 and corresponding metal nuts 512 may be replaced with any type of suitable electrical connector that serves to connect the signal wires from the semiconductor strain gages to the larger signal wires passing to the corresponding instrument or recording the measured strain. It should also be appreciated that a protective box or housing (not shown) may be placed over the entire device as attached to the metal of interest 502 to protect against any undesired physical contact, such as bumping.

It should be appreciated that the metal sintered disk described above in connection with FIGS. 1-5 provides one embodiment of the porous portion of the metal body or metal shim that provides the structure for holding the ceramic interface or layer. However, it should be appreciated that the porous portion can be provided in other ways. In one embodiment, the porous portion of the metal body or metal shim is an area of material that has been engineered to have desirable mechanical and chemical bonding characteristics and may have varied porosity through the application of 3D printing, including direct metal laser sintering, or powdered metallurgy. For example, this area could have a higher surface energy to bond to ceramic glazes or oxide compounds whereas the rest of the structure is composed of highly passivated material such as nickel or stainless steel. This area may also be engineered to have a specific thermal expansion ratio to better accommodate expansion of the ceramic bonding and insulating layer. In this case, there is no sintered disk.

With the use of powdered metallurgy, a transition between metal alloys can be made so that the parent metal shim is continuous (uninterrupted with no welding) with a section of metal material that has ideal properties for the ceramic bonding. For example, the metal body or metal shim may be engineered to have a metal composition that transitions from one composition to another through the metal body or shim such that the metal composition transitions to a composition that is favorable to bonding to ceramic at the location where the ceramic meets the metal body or shim or that provides a relatively better bond with the ceramic. Further, in embodiments where the semiconductor strain gage is disposed within a pocket or depression, as opposed to a complete hole traversing through the metal body or shim, the metal composition underneath the semiconductor strain gage may also be transitioned to a composition that similarly more easily bonds to the ceramic underneath the semiconductor strain gage. In this embodiment, the metal composition can be transitioned to a composition having a thermal coefficient of expansion similar to, approximately the same as, or matching that of the ceramic base layer under the semiconductor strain gage location. More generally, in embodiments using a transitional metal composition, the composition can be transitioned to have ideal material properties and alloy at the interface location so that low energy welding techniques may be applied onto a structure and to provide exposed surfaces of the metal body or metal shim that are resistant to oxidation through the addition of chromium, nickel, and other similar passivating metals.

For example, a combination of metals such as bronze and stainless steel may be used in an engineered ratio. The ratio is determined by the bulk thermal expansion of the combination of these different materials. This thermal expansion can be tailored to match the thermal expansion (volumetric and linear) of the ceramic bonding layer. For example, in one embodiment, the metals may include 40% bronze and 60% 400 series stainless steel. Likewise the shim can be engineered to match the structure thermal expansion at the points of attachment to the structure of interest. The importance of defining the shim coefficient of thermal expansion (CTE) is to allow the ceramic to better match the expansion and have better response to thermal growth and shock. An engineered material or transitional material is advantageous for the purpose of chemical bonding to various categories of ceramic materials including glasses, silicates, clays, and phosphate based ceramics. However, it should be appreciated that the use of both a porous sintered disk and such engineered material may be combined to provide both mechanical and chemical bonding with the ceramic bonding layer.

Figure 6A:
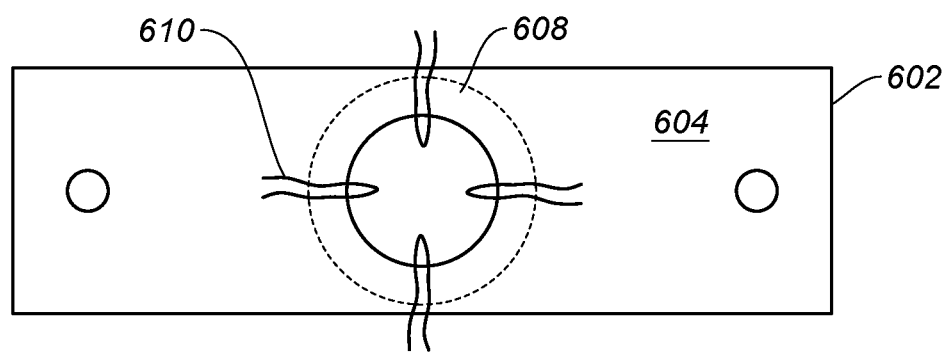
FIG. 6A is a top view of a semiconductor strain gage assembly according to another embodiment of the invention.
Figure 6B:
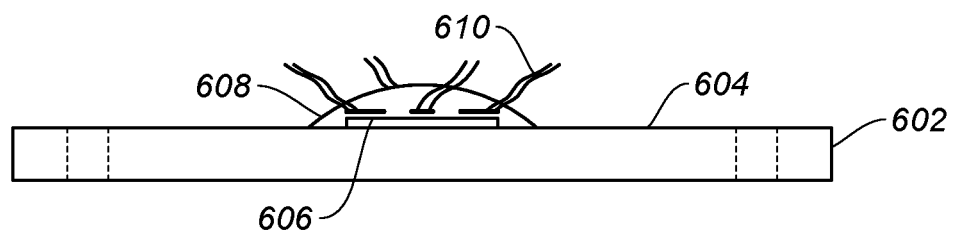
FIG. 6B is a side view of the semiconductor strain gage assembly of FIG. 6A according to another embodiment of the invention.

FIG. 6A is a top view of a semiconductor strain gage assembly according to another embodiment of the invention, and FIG. 6B is a side view of the semiconductor strain gage assembly of FIG. 6A. In this embodiment, a porous sintered disk within a hole or depression in a metal shim is not used. Rather, the semiconductor strain gage is disposed on a top surface of the metal shim, noting that a layer of ceramic or glass (not shown) is disposed between the top surface of the metal shim and the semiconductor strain gage. With reference to both FIGS. 6A and 6B, a metal shim 602, generically represented as a rectangular shape, is provided that has a top surface 604. A semiconductor strain gage or gages 606 are disposed on the top surface 604 of the metal shim 602. The semiconductor strain gage 606 is entombed and insulated with a ceramic layer 608. Signal wires 610 extend from the semiconductor strain gage 606 through the ceramic layer 608 and would ultimately be connected to corresponding equipment for recording the strain measurements made by the semiconductor strain gage 606. It should be appreciated that this semiconductor strain gage assembly can be manufactured using assembly methods such as SOI wafers and glazing approaches that have become practical with the custom material described above. In addition, the 3D printing of the material enables the use of glazing ceramics that bond between the metal and the semiconductor gage. Accordingly, such a semiconductor strain gage assembly provides advantages such as eliminating the need to re-liquefy the base ceramic to generate a secondary bond.

Figure 7:
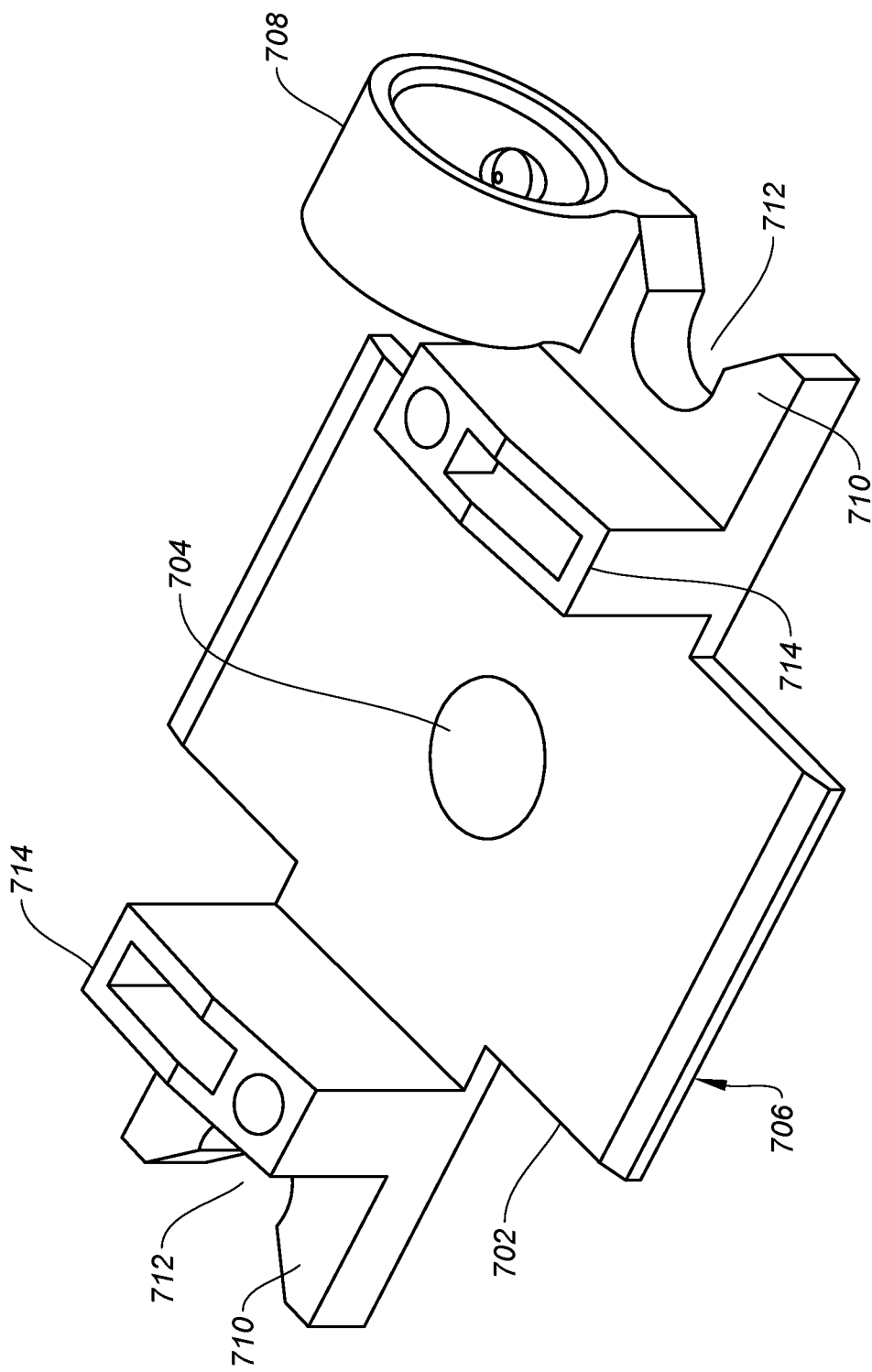
FIG. 7 is a top perspective view of a portion of a semiconductor strain gage assembly according to another embodiment of the invention.

FIG. 7 is a top perspective view of a portion of a semiconductor strain gage assembly according to another embodiment of the invention. As shown, a metal body or metal shim 702 holds a semiconductor strain gage or gages located at a given porous portion 704 within the metal shim 702, such as in the center of the metal shim 702. It should be appreciated that the semiconductor strain gage is essentially entombed within the metal shim 702 but can be entombed according to any of the embodiments described above. A cable connector 708 is used to connect a protective cable (not shown) within which signal wires would pass to an instrument for recording the strain measurements. In use, a bottom surface 706 of the metal shim 702 would be placed on the surface of interest. Tabs 710 with eyes 712 on opposing ends can be used to attach the final assembly or load cell (as shown in connection with FIG. 8) to the surface of interest. In one embodiment, the load cell can be attached to the surface of interest using capacitive discharge welded studs, noting that the eyes 712 can be opened or closed depending upon the particular application in which the load cell is being used. It should be appreciated that additional structures 714 integral to the metal body or shim 702 are used in connecting additional portions of the overall load cell as described further below.

Figure 8:
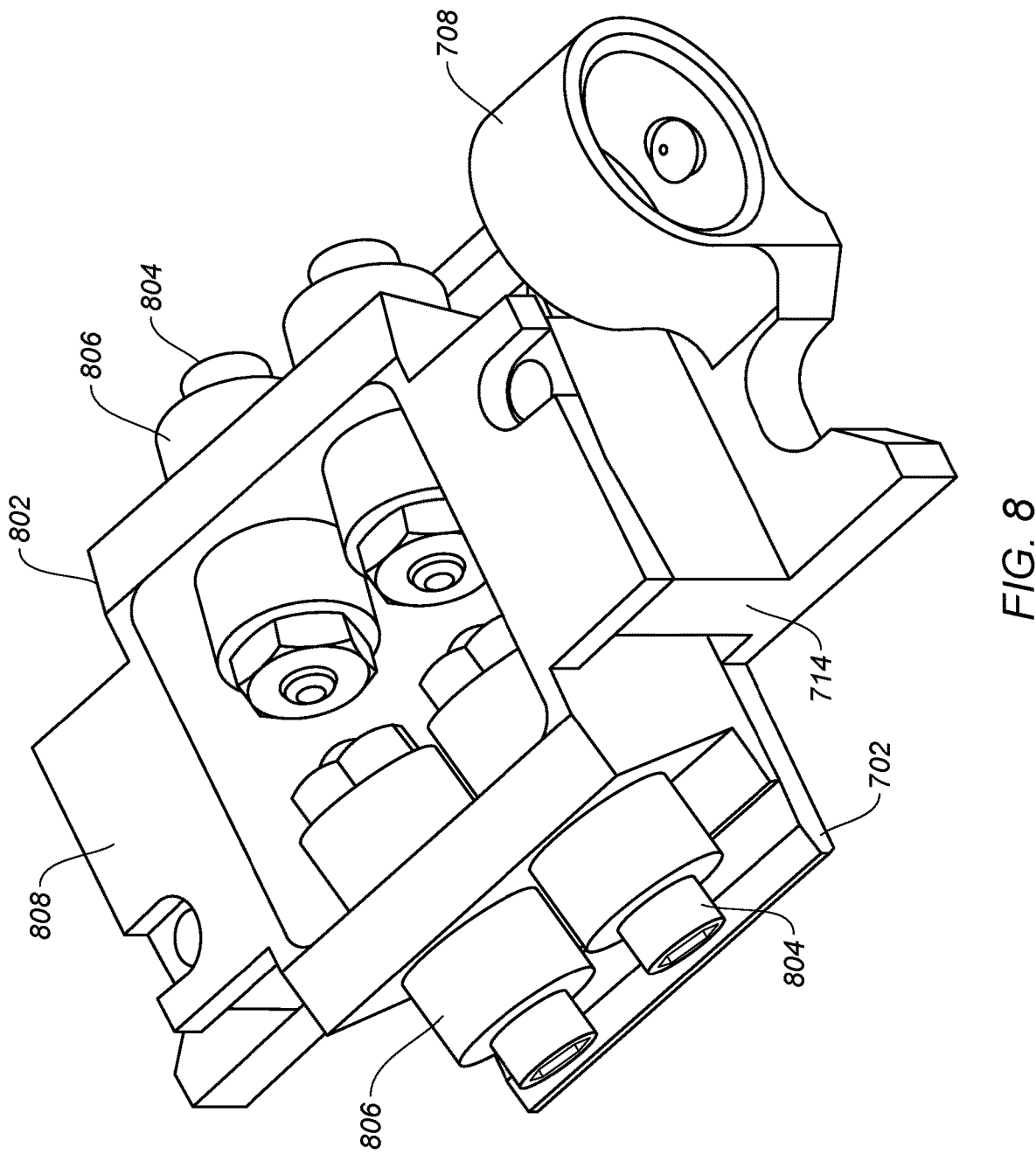
FIG. 8 is a top perspective view of an additional portion of the semiconductor strain gage assembly of FIG. 7 according to another embodiment of the invention.

FIG. 8 is a top perspective view of an additional portion of the semiconductor strain gage assembly of FIG. 7 according to another embodiment of the invention. As shown, an additional component of the overall load cell is shown on top of the structure of FIG. 7. Specifically, a body 802 houses electrical connectors or signal lead-in points 804 corresponding to the number of semiconductor strain gages disposed with the metal body or metal shim 702. In this embodiment, four electrical connectors 804 are housed by the body 802. It should be appreciated that each electrical connector 804 is insulated by an insulation cover 806. It should be appreciated that signal wires (not shown) would be used to connect each semiconductor strain gage with one end of each of the corresponding electrical connectors 804. It should also be appreciated that additional sets of signal wires (not shown) would be connected to opposite ends of the electrical connectors 804 and pass from the electrical connectors 804 through the protective cable (not shown) held by the cable connector 708 to corresponding equipment for recording strain measurements. The body 802 has tabs 808 that are disposed on top of the structures 714 to position the body 802 over the metal shim 702.

Figure 9:
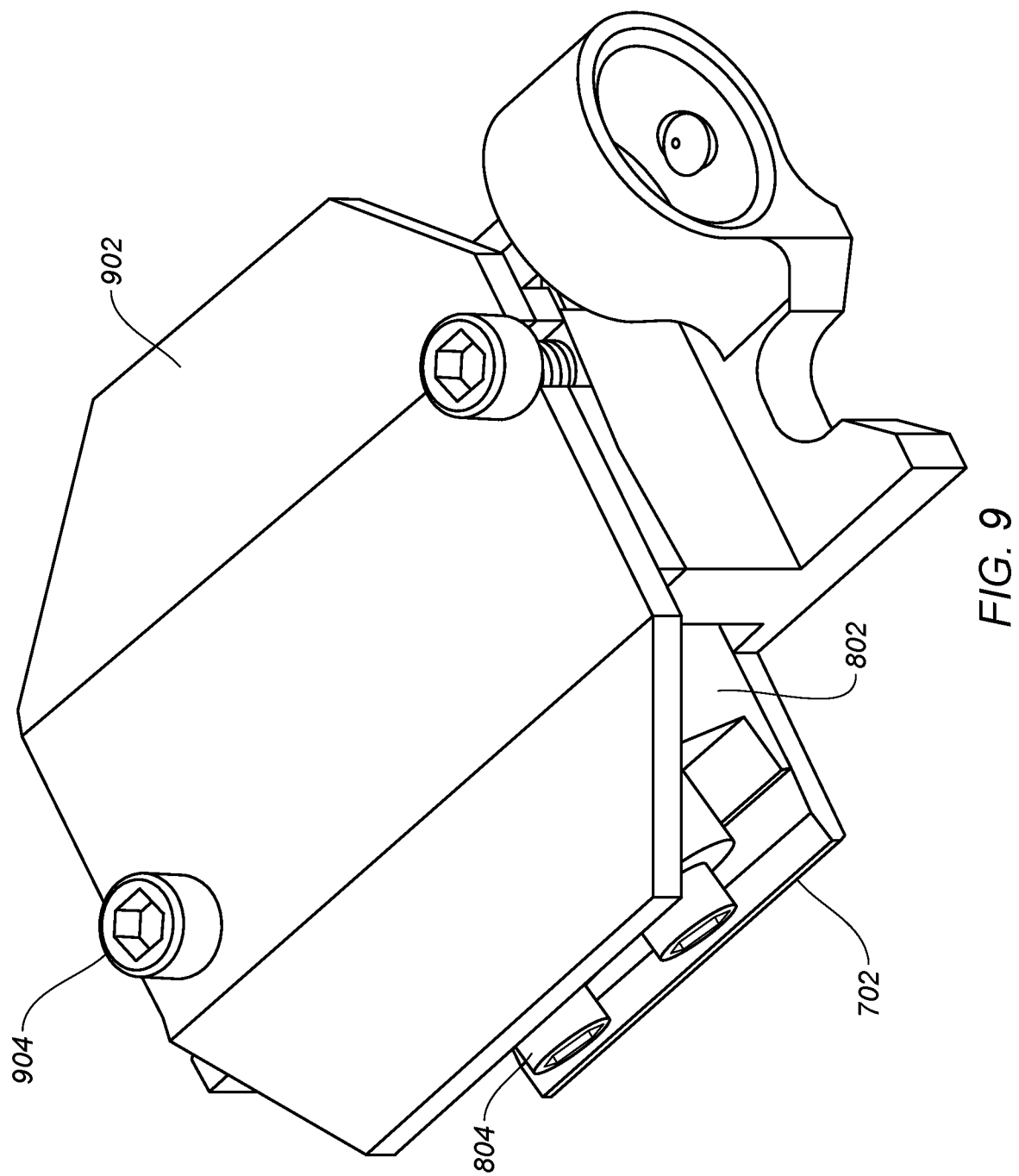
FIG. 9 is a top perspective view of an additional portion of the semiconductor strain gage assembly of FIG. 7 according to another embodiment of the invention.

FIG. 9 is a top perspective view of an additional portion of the semiconductor strain gage assembly of FIG. 7 according to another embodiment of the invention. As shown, the structures of FIGS. 7 and 8 are covered by a top cover 902. Screws 904 can be used to hold the top cover 902 in place and in addition secure the body 802 housing the electrical connectors 804 and the metal body 702 together.

It should be appreciated that the load cell shown in connection with FIGS. 7-9 is an example of a field deployable load cell in that its design and corresponding structure can be altered depending upon the specific application in which the load cell is to be used. In general, the overall design of the load cell is to house the strain gages and corresponding electrical connectors to provide protection for these various components and to direct the mechanical strain that is sensed through the gage in a manner optimal for sensing. For example, in some embodiments, the load cell assembly or structure can be made from a material with thermal expansion greater than the attachment points onto a structure of interest for measurements. This provides for increased interface tightness due to delta expansion during increases in the temperature.

It should be appreciated that any of the foregoing strain gage assemblies or load cells can be attached to a surface of interest using low energy welding techniques. For example, the load cell can be built into the facet of a capacitive discharge weld stud so that the plasma discharge occurs fully under the surface of the strain gage assembly. In such cases, the energy required for assembly attachment to the structure is under 125 Watt seconds and remains below requirements for pre and post-weld heat treatments defined by ASME B31.1. In addition, a handheld capacitive discharge stud gun can be fitted with a collet designed to accept a strain gage assembly geometry. In some embodiments, the strain gage assembly can be attached to a structure by means of a jig designed to orient and fixture the strain gage assembly enabling low energy welding, wherein the jig is made with a momentary or switched magnetic base for attachment to ferrous or magnetic structures. In some embodiments, the jig can be used with a collet designed to accept a strain gage assembly and pass electrical current for a capacitive discharge welding process. In some embodiments, the gage assembly is driven into the weld plasma by this jig with a spring, pneumatic, hydraulic, or actuator such as a solenoid. Further, the jig may contains bearings allowing a center shaft or plunger to egress with a linear motion and drive the strain gage assembly into the weld plasma.

In some embodiments, the load cell can be deployed and attached to the surface of interest using low energy capacitive discharge welding. The use of capacitive discharge welding is within the limits of welding permitted on boiler structures for existing sensor technologies such as thermocouples. The use of such procedures prevents the need for structural weld pre-heat or post-heating. The load cell can be attached by multiple capacitive discharge studs. It can also be deployed within the bonded face of a single stud, eliminating any need for multiple attachment points. The feature of having the gage built in to the base of the CD weld stud is highly advantageous to field applications where installers are required to quickly apply the strain gage in difficult environmental conditions. Additionally, the use of capacitive discharge stud welding allows this sensor technology to be deployed by the expected skill level of power industry workers. However, it should be appreciated that in some embodiments, the load cell or strain gage assembly can be affixed onto studs or fasteners without welding the assembly to the fasteners and continue to measure strain at temperatures above the installation temperature.

It should be appreciated that the device may be used to measure the strain in any metal surface of interest. In some embodiments, the metal surface of interest may be a mild steel, a low-alloy steel, a stainless steel including 304, 316, a 17-4PH steel, and various creep strength-enhanced ferritic steel alloys including, for example, Grade 91 and Grade 92. It should be appreciated, as described above, that when measuring the strain of a metal surface of interest having one of these compositions, the metal body or in some embodiments, the metal shim, may similarly be constructed using the same or similar metal to that of the metal surface of interest. Accordingly, in some embodiments, the metal shim may be a mild steel, a low-alloy steel, a stainless steel including 304, 316, a 17-4PH steel, and various creep strength-enhanced ferritic steel alloys including, for example, Grade 91 and Grade 92. In some embodiments, the metal shim may be constructed from a high temperature alloy or a ferrous alloy that has a relatively high nickel or chrome concentration, or other alloy-attributes, that are suitable for a high temperature environment. In some embodiments the metal shim may be constructed from metals having stable surface oxide, such as chrome or nickel oxides. In some embodiments, titanium may be used, which may be useful for measuring strain in aircraft or spacecraft engines, air frame, fuselage, heat exchangers, etc.

It should be appreciated that the device may also be used to measure the strain in any non-metallic surface of interest. In such cases, the strain measurements may be correlated to other properties of the surface of interest. For example, in some embodiments, the measurements could be used to measure fluid pressure.

Various embodiments of the invention have been described above. However, it should be appreciated that alternative embodiments are possible and that the invention is not limited to the specific embodiments described above. For example, the semiconductor strain gage can be fabricated from a semiconductor material such as doped silicon or silicon carbide by means of plating ohmic contacts using a transition metal or intermetallic compound having diffusion rates acceptable to the duration of use of the strain gage and operating temperature. The plating metal must fill vacancies in the semiconductor lattice and (once occupied) become immobile at a specific gradient of concentration starting from the surface of the semiconductor material. This is empirically understood and modeled as an exponent of temperature and time with approaches such as the Frank-Turnbull model. In some embodiments, plating ohmic contacts using a transition metal or intermetallic compound may have oxygen diffusion rates less than X at 1200 F. In some embodiments, plating ohmic contacts using a transition metal or intermetallic compound that have silicon-involved intermetallic and eutectic phases at temperatures above 1200 F can be done.

What is claimed is:

1. A device for measuring strain, comprising:
   a metal body comprising a porous portion and a ceramic portion disposed on said porous portion; and
   a semiconductor strain gage coated in a ceramic material disposed on said ceramic portion;
   wherein said body has a surface for attachment to an object to measure strain of the object.

2. The device of claim 1, wherein said porous portion comprises a porous metal disk.

3. The device of claim 2, wherein said porous metal disk comprises a metal sintered disk.

4. The device of claim 3, wherein said ceramic portion is bonded to said metal sintered disk.

5. The device of claim 1, wherein said ceramic portion is bonded to said metal body.

6. The device of claim 5, wherein said porous portion is within said metal body and wherein said ceramic portion is at or below an exposed surface of said metal body.

7. The device of claim 1, wherein said porous portion is beneath said ceramic portion and said semiconductor strain gage.

8. The device of claim 1, wherein said porous portion is within said metal body and wherein said ceramic portion is at or below an exposed surface of said metal body.

9. The device of claim 1, wherein said ceramic portion comprises a ceramic composition that thermally expands during use in conjunction with a thermal expansion of said metal body.

10. The device of claim 1, wherein said metal body comprises a composition that thermally expands during use in conjunction with a thermal expansion of said ceramic portion.

11. The device of claim 1, wherein said metal body comprises a composition that transitions from a first composition at a first location within said metal body to a second composition at a second location within said metal body, wherein said second location is adjacent to said ceramic portion and said second composition bonds with said ceramic portion better than said first composition.

12. The device of claim 1, wherein said metal body comprises a composition that transitions from a first composition at a first location within said metal body to a second composition at a second location within said metal body, wherein said second location is adjacent to said ceramic portion and said second composition has a thermal coefficient of expansion that is approximately the same as said ceramic portion.

13. A method for making a device for measuring strain, comprising:
    forming a ceramic portion attached to a porous portion of a metal body; and
    bonding a semiconductor strain gage coated with a ceramic material to the ceramic portion.

14. The method of claim 13, wherein said forming comprises disposing a first ceramic layer within the body, wherein said bonding comprises bonding the semiconductor strain gage to the first ceramic layer.

15. The method of claim 13, wherein said metal body comprises a mixed metal body having a metal composition that transitions from a first composition at a first location within the mixed metal body to a second location within the mixed metal body and wherein said forming the ceramic portion attached to the mixed metal body comprises bonding the ceramic portion to the second composition of the mixed metal body at the second location.

16. The method of claim 13, wherein said metal body comprises a mixed metal body having a metal composition that transitions from a first composition at a first location within the mixed metal body to a second location within the mixed metal body and wherein the second composition has a thermal coefficient of expansion that is approximately the same as the ceramic portion.

17. The method of claim 13, wherein said forming the ceramic portion attached to the body comprises:
    adding a first liquefied ceramic material to a porous portion of the body; and
    partially curing the first liquefied ceramic material to produce a partially cured liquefied ceramic material;
    and wherein said bonding the semiconductor strain gage to the ceramic portion comprises:
    placing the semiconductor strain gage and a second liquefied ceramic material on the partially cured liquefied ceramic material.

18. The method of claim 17, wherein the first liquefied ceramic material has the same composition as the second liquefied ceramic material.

19. The method of claim 17, further comprising:
    adding a third liquefied ceramic material having a composition that is different from the first liquefied ceramic material and the second liquefied ceramic material, to re-liquefy the partially cured liquefied ceramic material and providing bonding to the semiconductor strain gage.

20. A method for measuring strain of an object, comprising:
    attaching a body comprising a semiconductor strain gage encapsulated in a ceramic material to a surface of an object, wherein the semiconductor strain gage comprises at least one signal wire electrically connected to the semiconductor strain gage and passing through the ceramic material;
    electrically connecting the at least one signal wires to an instrument configured for receiving an electrical signal produced by the semiconductor strain gage; and recording the electrical signal produced by the semiconductor strain gage with the instrument.

* * * * *